Patented Oct. 16, 1951

2,571,099

UNITED STATES PATENT OFFICE 2,571,099

PROCESS FOR HYDROCYANATION OF CONJUGATED DIOLEFINIC COMPOUNDS

Paul Arthur, Jr., and Burt Carlton Pratt, Wilmington, Del., assignors to E. I. du Pont de Nemours & Company, Wilmington, Del., a corporation of Delaware No Drawing. Application January 7, 1950, Serial No. 137,482

7 Claims. (Cl. 260—465.3)

This invention relates to a new process for preparing nitriles. More particularly, it relates to an improved process for adding hydrogen cyanide to olefinic double bonds.

This application is a continuation-in-part of application Serial No. 37,503, filed July 7, 1948, now abandoned.

It is known that addition of hydrogen cyanide to activated double bonds, i. e., to ethylenic bonds adjacent to an activating group such as the nitrile or acyloxy groups, proceeds with relative ease. On the other hand, it is extremely difficult to add hydrogen cyanide to a double bond in an olefinic hydrocarbon where no such activating influence exists. It has been pointed out by Migrdichian in his recent book "Chemistry of Organic Cyanogen Compounds" (A. C. S. Monograph 105, page 219) that addition of hydrogen cyanide to olefins, if it proceeds at all, requires high pressures of the order of 1000 lbs./sq. in. or more and high temperatures within the range of 200–400° C.

This invention has as an object the conjugate (1,4) or non-conjugate (1,2) addition of hydrogen cyanide to a polyolefin having at least two ethylenic linkages conjugated. Other objects will appear hereinafter.

These objects are accomplished by the following invention wherein a conjugated polyene hydrocarbon, i. e., a hydrocarbon having at least two conjugated carbon-to-carbon double bonds which are ethylenic, i. e., non-aromatic in nature, is reacted with hydrogen cyanide in contact with nickel carbonyl. Preferably, the reaction is carried out at a temperature above 50° C.

The polyene hydrocarbon and the hydrogen cyanide are suitably employed in approximately equimolecular proportions, but if desired either reactant can be present in excess, which may be large, e. g., 2 to 10 moles per mole. However, since diene hydrocarbons, for example, 1,3-butadiene, are ordinarily readily polymerizable it may be preferred not to use an excess of it since, while a higher conversion of the hydrogen cyanide may be obtained, there may also be an increase in the formation of polymeric residues.

The catalyst suitable for this reaction is nickel carbonyl, Ni(CO)$_4$, i. e., the compound which nickel forms with four molecules of carbon monoxide. This compound may be prepared by methods described in the literature. In the pure form, nickel carbonyl is a liquid boiling at 43° C., but it is not necessary for the purpose of this process to use the pure compound. The nickel carbonyl catalyst is used in proportions, based on the polyene hydrocarbon, between about 0.01 and 0.3 mole per mole, although more can be used if desired. A generally useful range is between 0.03 and 0.2 mole of catalyst per mole of unsaturate. Surprisingly, free nickel is ineffective in the hydrocyanation reaction at the low temperatures and pressures at which the nickel carbonyl is effective. It is also noteworthy that, while monoolefins can be hydrocyanated with the help of nickel carbonyl as a catalyst, the reaction is not nearly as clean-cut as with conjugated diolefins, since it leads in general to polymeric products.

The reaction is preferably carried out in a substantially anhydrous medium although some water, for example the small amount (2–3%) present in commercial liquid hydrogen cyanide, is not usually detrimental. Even much larger amounts of water may be present but in such cases the conversion is in general sharply decreased. The highest conversions are observed when the hydrogen cyanide is at least partly dried, for example by passing it through a dehydrating agent, and also when the volatile acidic stabilizers sometimes present in it are at least partly removed, for example by bubbling nitrogen through the hydrogen cyanide for a few minutes.

While the reaction takes place readily without addition of an extraneous solvent, it has been observed that better yields of nitrile sometimes result when the system comprises a solvent for the reactants and catalyst, probably because dilution tends to reduce the formation of polymers. Any aliphatically saturated organic liquid substantially inert towards reactants and catalysts may be used, in particular hydrocarbons such as benzene, toluene, hexane, cyclohexane, etc.; alcohols such as methanol, ethanol, butanol, etc.; ethers such as dipropyl ether, dibutyl ether, etc.; or other solvents such as tetrahydrofuran, etc. The solvent may be used in any desired proportions, such as between 0.5 mole and 10 moles or more based on the ethylenic compound.

The hydrocyanation reaction normally proceeds very slowly at low temperature, and to achieve a practical reaction rate it is generally desirable to operate above about 50° C. The upper limit of temperature is dictated only by the decomposition point of the reactants. In practice, however, it is seldom desirable to operate above 200° C. A generally useful temperature range is that between 80 and 150° C. It may be noted that nickel carbonyl decomposes at relatively low temperature. It is possible that it is Converted during the reaction to other nickel derivatives having catalytic activity.

Since hydrogen cyanide boils at 26° C. and since the other reactants and solvents are in general volatile, it is necessary to operate in a closed, pressure-resistant vessel. Any suitable pressure vessel, such as the conventional autoclaves or bombs, may be used. Reactors designed for continuous or semi-continuous operation may be used. If desired, agitation may be provided either internally or externally. The reaction proceeds at the autogenous pressure of the reactants and no additional pressure is necessary, although such may be used if desired. In this case, pressure may be provided by any inert gas such as nitrogen or air, or by an excess of a volatile unsaturate such as ethylene. Since the the autogenous pressure of the reactants is not very high, it is unnecessary to use equipment designed for extremely high pressures.

The reaction time depends upon several factors including the nature of the unsaturate and the temperature. In general some nitrile will have formed within one or two hours at temperatures within the preferred range, i. e., above 80° C., and after 6 to 10 hours there is little further reaction and there is the danger of decomposing the reaction product. The nitrile or mixture of nitriles which form may be isolated by any suitable method such as direct distillation, steam distillation, crystallization if the nitriles are solid, etc. The unused hydrogen cyanide and polyene hydrocarbon may be recovered and used again. As has already been mentioned, the catalyst is decomposed during the reaction.

The following examples in which parts are by weight are illustrative of the invention.

Example I

There was charged into a stainless steel reactor 47.4 parts of hydrogen cyanide, 82 parts of 1,3-butadiene and 17 parts of nickel tetracarbonyl. The reaction mixture was brought to a temperature of 140° C. within a period of 2⅓ hours and maintained at that temperature for 10½ hours. The reaction product was isolated by steam distillation and fractionation. This yielded 7 fractions totalling 12.6 parts of pentenenitrile, boiling at 136–144° C. and having a refractive index $n_D^{25}$ 1.4190, except for the first fraction which had $n_D^{25}$ 1.4204. The middle fraction, which was shown to be exclusively 3-pentenenitrile by infrared absorption spectrography, boiled at 143.8–144° C. In addition, two fractions boiling at 117.6–120.3° C. were obtained, which comprised 2-methyl-3-butenenitrile containing also 4-vinylcyclohexene.

It has been observed that, in certain cases, the activity of the nickel carbonyl catalyst may be enhanced by the presence in the reaction mixture of tertiary aryl phosphines or arsines. The influence of these promoters is shown in the following examples.

Example II

A pressure vessel was cooled in a carbon dioxide acetone mixture and charged with 55.8 parts of 1,3-butadiene, 27 parts of hydrogen cyanide, 8.54 parts of nickel tetracarbonyl, 26.2 parts of triphenylphosphine and 132 parts of benzene. The vessel was maintained for one-half hour at each of the following temperatures: 80° C., 100° C. and 120° C., and finally at 140° C. for 10 hours. Distillation of the reaction product gave 55.4 parts of volatile nitriles of which 9.8 parts boiled within the range 119–135° C., 41 parts between 135 and 156° C. and 4.6 parts between 156 and 285° C. Infrared absorption spectra of the heart cuts of the two lower fractions (B. P., 125–128° C.; $n_D^{25}$ 1.4169 and B. P. 142° C.; $N_D^{25}$ 1.4218) showed that these materials were pentenenitrile isomers, principally 3-pentenenitrile, 2-methyl-3-butenenitrile, cis-2-pentenenitrile and trans-2-pentenenitrile. The last two products were apparently formed by isomerization of 3-pentenenitrile during the reaction.

In comparison, a similar experiment except that the triphenylphosphine was omitted gave a total of only 16.1 parts of volatile nitriles.

Example III

Example II was repeated except that the triphenylphosphine was replaced by 30.6 parts of triphenylarsine. Fractionation of the reaction product gave a total of 22.3 parts of volatile nitriles, of which 7.7 parts boiled between 60 and 82° C. at 100 mm. pressure and 14.6 parts boiled at 82–84° C. at 100 mm. pressure. This latter fraction was 3-pentenenitrile, as shown by iodine number and infrared absorption spectrum.

In the process of this invention there may be employed any conjugated polyene hydrocarbon having at least two conjugated carbon-to-carbon double bonds aliphatic in character. In addition to 1,3-butadiene there may be mentioned, as suitable unsaturates, isoprene, alpha-methylbutadiene, beta, gamma - dimethylbutadiene, alpha-phenylbutadiene, beta-phenylbutadiene, alpha-allylbutadiene, 1,3,5-hexatriene, 3-methyl-2,4,6-heptatriene, and the like. The process is applicable to unsaturated compounds having substituents such as nitrile, halogen, hydroxyl, alkoxy, carboxy, etc., particularly in cases where these substituents are more than one carbon removed from the double bond, i. e., are "isolated" or "independent" and thus exert no activating influence. However, the special usefulness of the process lies in its application to olefinic hydrocarbons since this class of compounds is particularly resistant to hydrocyanation by the methods heretofore known. Among the polyene hydrocarbons, the process is especially useful in connection with those having from two to eighteen carbon atoms and two conjugated ethylenic double bonds, since such hydrocarbons are most easily accessible. The more reactive of such hydrocarbons are those wherein each doubly bonded carbon bears at least one hydrogen atom. Diolefins having a doubly bonded carbon free from hydrogen are not preferred, since the addition product is formed in less advantageous amount and tends to be polymeric. A specific and important use of the process is the hydrocyanation, with nickel carbonyl, of 1,3-butadiene.

The nitriles obtainable by this process are useful as chemical intermediates in the synthesis of acids, amines, amides, etc. They are also useful per se as insecticides, fumigants, solvents, etc.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of nitriles which comprises reacting a conjugated diolefine with hydrogen cyanide at a temperature of at least 50° C. and in contact with nickel carbonyl.

2. Process for the preparation of nitriles which comprises reacting a conjugated diolefine with hydrogen cyanide at a temperature of at least 50° C. and in contact with nickel carbonyl and a member of the class consisting of triarylphosphines and triarylarsines.

3. Process for the preparation of nitriles which comprises reacting 1,3-butadiene with hydrogen cyanide in the presence of a nickel carbonyl catalyst.

4. Process for the preparation of nitriles which comprises reacting, at 50–200° C. and in a closed system, a conjugated diolefine with hydrogen cyanide in contact with nickel carbonyl.

5. Process of claim 4 wherein the conjugated diolefine is 1,3-butadiene.

6. Process for the preparation of nitriles, which comprises reacting a polyene hydrocarbon having at least two conjugated non-aromatic, carbon-to-carbon double bonds with hydrogen cyanide at a temperature of at least 50° C. and in contact with nickel carbonyl.

7. Process for the preparation of nitriles which comprises reacting a conjugated diolefine with hydrogen cyanide in contact with nickel carbonyl.

PAUL ARTHUR, JR.
BURT CARLTON PRATT.

REFERENCES CITED

The following references are of record in the file of this patent:

UNITED STATES PATENTS

| Number | Name | Date |
|---|---|---|
| 2,158,031 | Loder | May 9, 1939 |
| 2,385,741 | Teter | Sept. 25, 1945 |
| 2,402,873 | Coffman et al. | June 25, 1946 |
| 2,447,600 | Schulze et al. | Aug. 24, 1948 |
| 2,455,995 | Harris et al. | Dec. 14, 1948 |
| 2,464,723 | Schulze et al. | Mar. 15, 1949 |
| 2,509,859 | Coffman et al. | May 30, 1950 |
| 2,510,105 | Hedberg | June 6, 1950 |

FOREIGN PATENTS

| Number | Country | Date |
|---|---|---|
| 884,974 | France | Sept. 1, 1943 |

OTHER REFERENCES

Mowry, Chem. Reviews, vol. 42, p. 222 (1948).